March 16, 1971 K. A. KLENZ 3,570,088
CLIPPING APPARATUS
Original Filed June 26, 1967 4 Sheets-Sheet 1
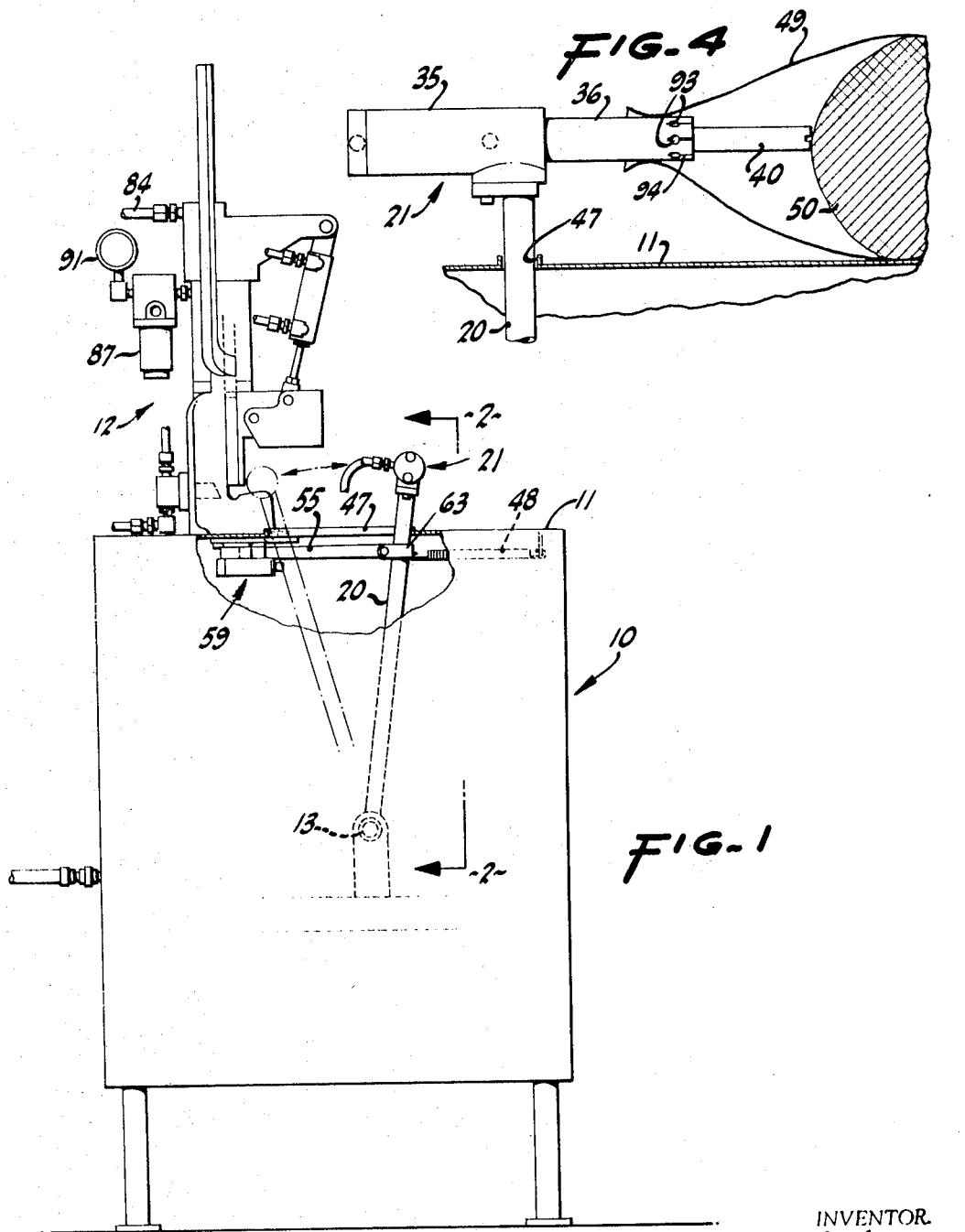
INVENTOR.
KARL A. KLENZ
BY Gordon Wood.
ATTORNEY

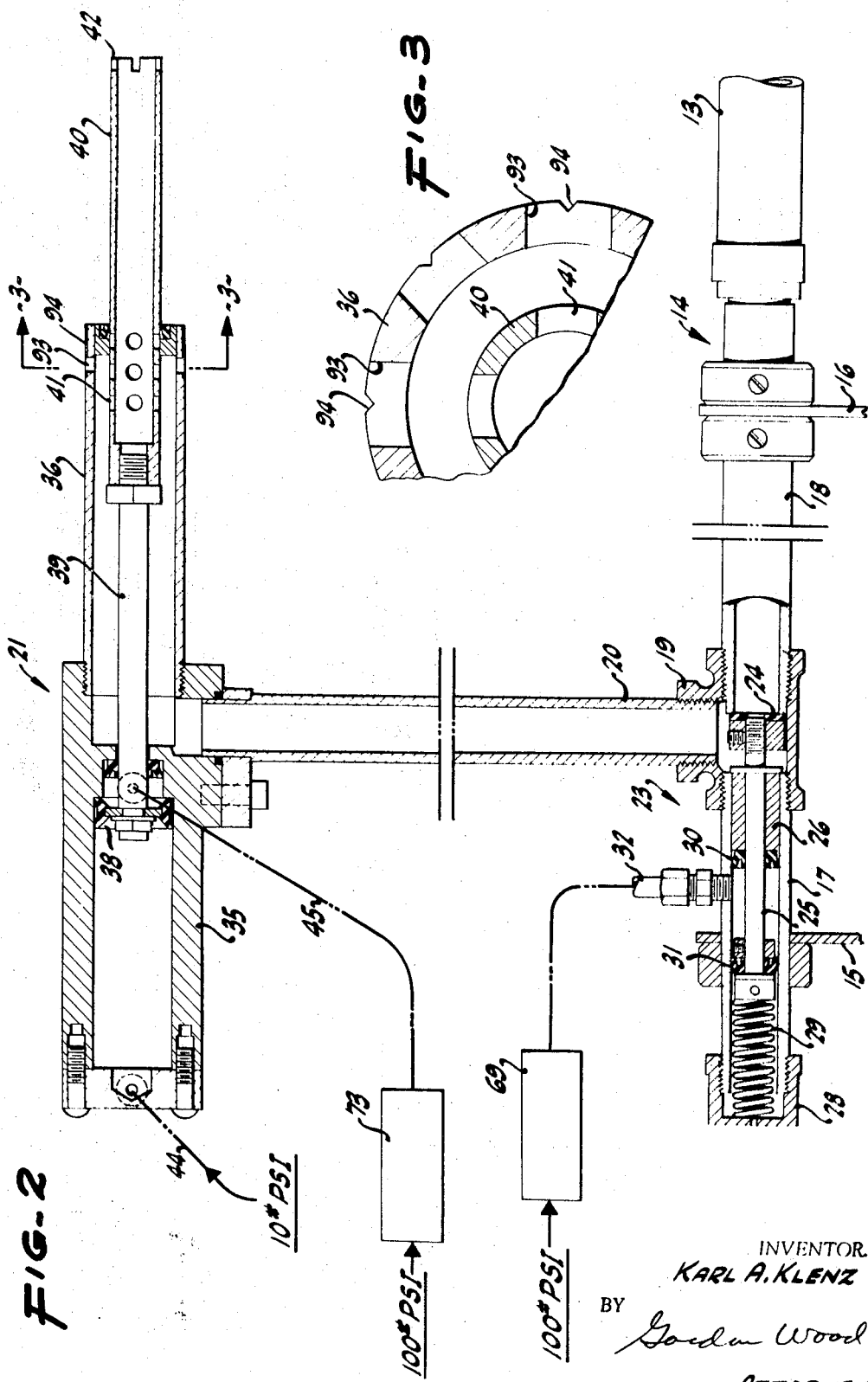

March 16, 1971      K. A. KLENZ      3,570,088
CLIPPING APPARATUS
Original Filed June 26, 1967      4 Sheets-Sheet 3
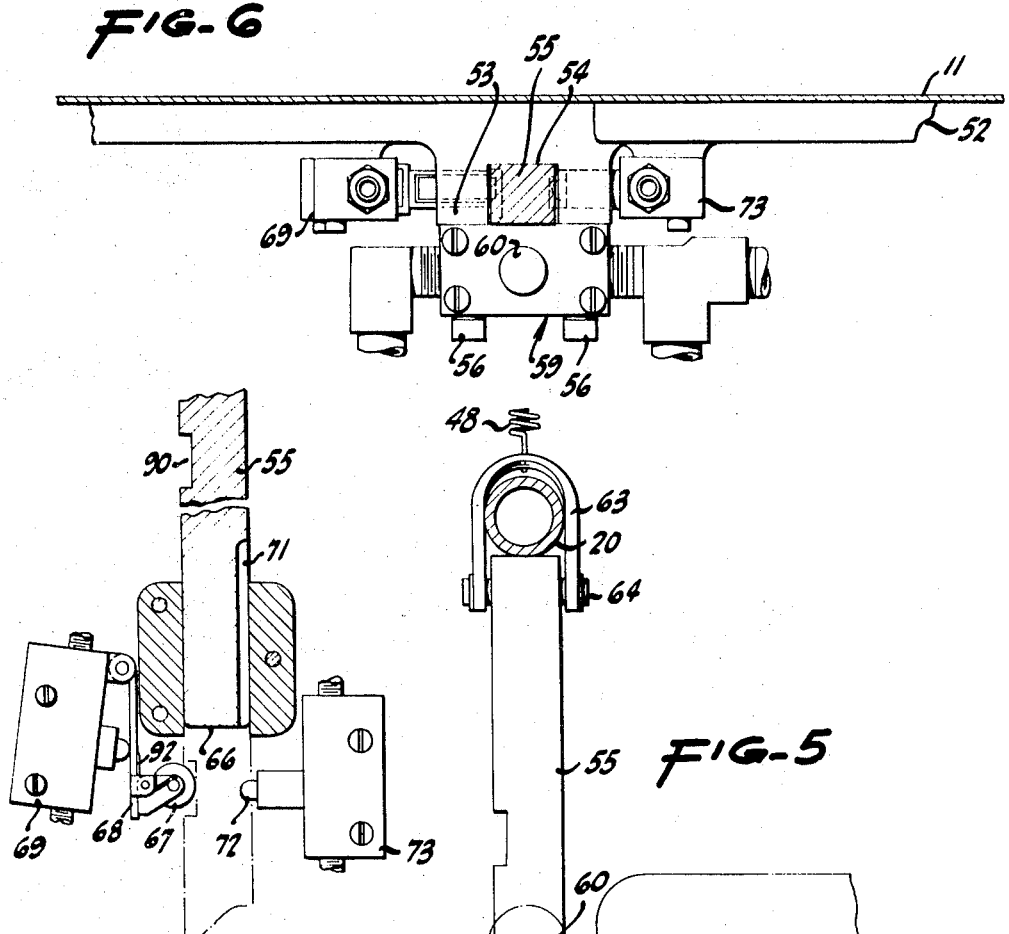
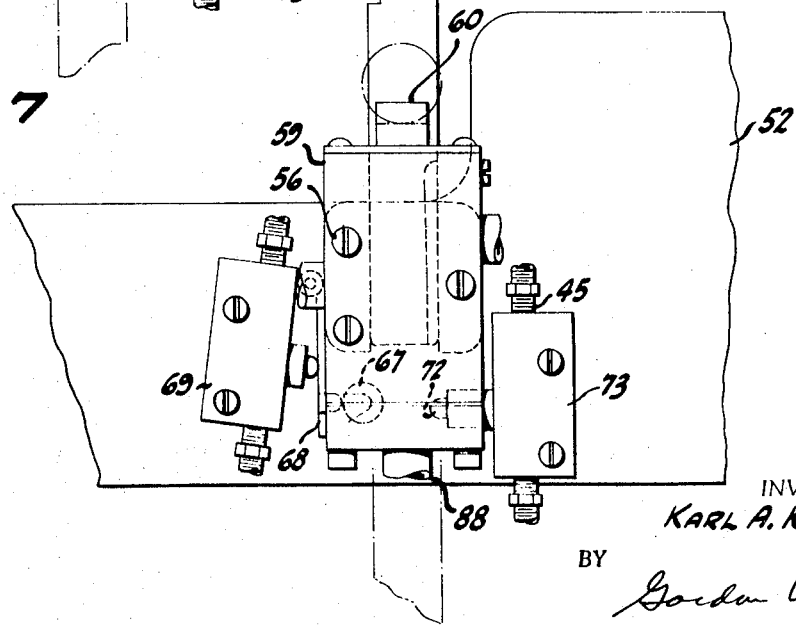
INVENTOR.
KARL A. KLENZ
BY
Gordon Wood
ATTORNEY

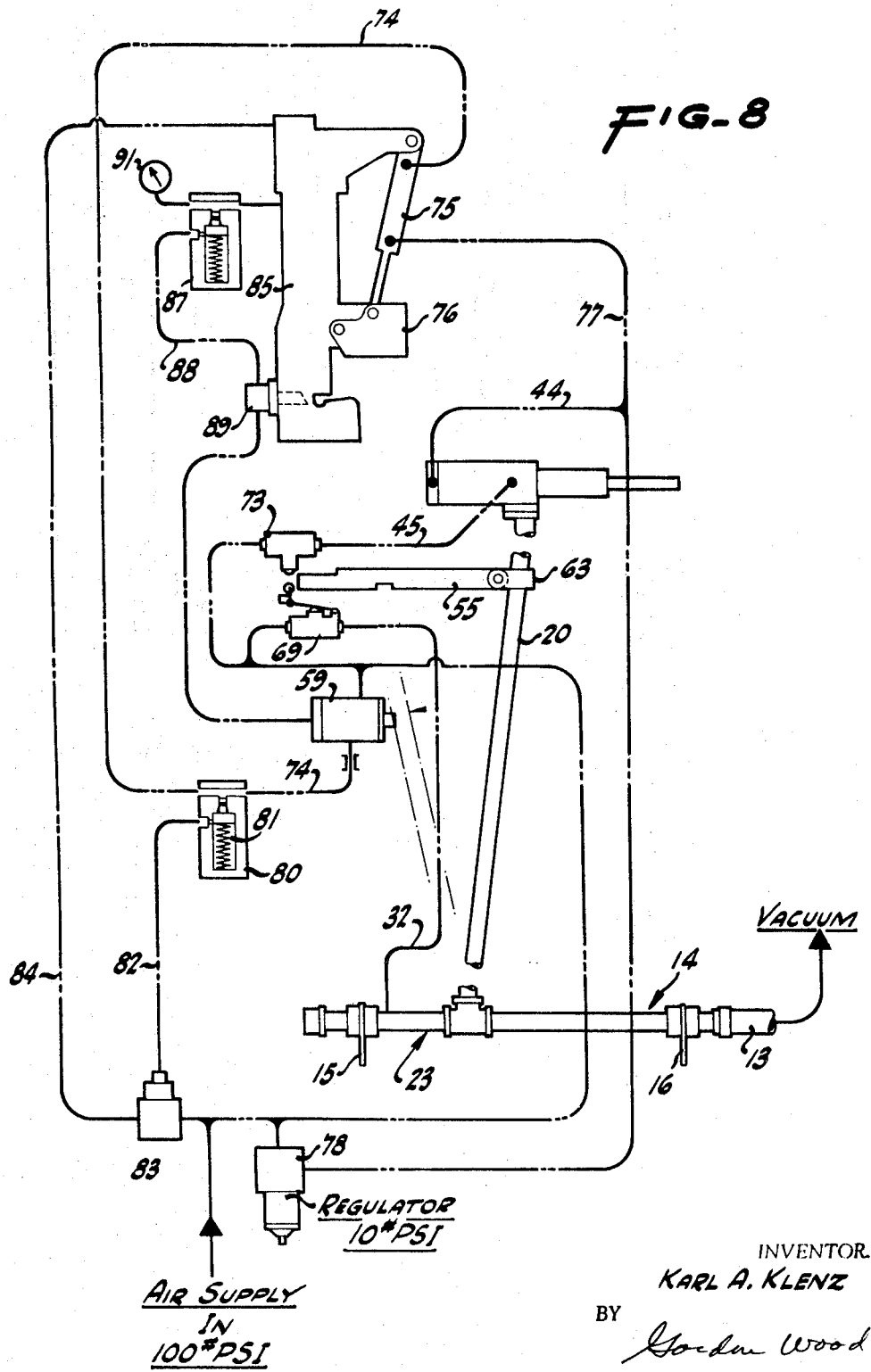

United States Patent Office 3,570,088
Patented Mar. 16, 1971

1

3,570,088
CLIPPING APPARATUS
Karl A. Klenz, Oakland, Calif., assignor to Rheem Manufacturing Company, New York, N.Y.
Original application June 26, 1967, Ser. No. 648,670, now Patent No. 3,516,222, dated June 23, 1970. Divided and this application June 18, 1969, Ser. No. 862,546
Int. Cl. B65b 51/05
U.S. Cl. 29—33                3 Claims

ABSTRACT OF THE DISCLOSURE

Apparatus for evacuating a flexible container such as a food casing and applying an air tight seal thereto. By means of control valves a vacuum is applied to the container upon initiation of the operating cycle and actuation of the sealing device automatically shuts off the vacuum. Control valves are programmed so that gathering means for constricting the mouth of the container, a retractable probe projected into the container to facilitate evacuation of the container, and a cut off knife for severing the container outwardly of the seal are all actuated at predetermined times in the cycle for performing the required steps substantially automatically without intervention of the operator.

---

This is a division of application Ser. No. 648,670 filed June 26, 1967, now Pat. No. 3,516,222, June 23, 1970.

This invention relates to an apparatus for vacuum sealing flexible containers such as sausage casings and other food wraps. The invention consists of apparatus very similar to that shown in U.S. Patent No. 3,237,366 dated March 1, 1966 and is an improvement thereover.

In sealing casings, bags and other coverings for food products and the like it is desirable to extract as much air as possible from the container prior to sealing the same so as to minimize spoilage during storage or freezing. The apparatus disclosed in the above noted patent is extremely effective in that the drawing of a vacuum and the hermetic sealing of the casing or container may be accomplished by a simple manual operation so that the sealing step is performed while the vacuum is still applied to the bag or container. However, a disadvantage attending the operation of the structure shown in the above patent is that optimum use is not made of the vacuum source thus losing vacuum and wasting the power required to create the same.

In application Ser. No. 545,317 filed Apr. 26, 1966 certain improvements are disclosed over the structure shown in the above noted patent. Such improvements are directed to applying the vacuum more quickly to the container and to shutting off the vacuum immediately after the sealing step has been performed so as to obtain a more effective evacuation of the container and at the same time prevent wasting the vacuum. The present invention has as one of its objects achieving the result obtained by the apparatus of the pending application but in a less expensive and more effective manner.

Another object of the present invention is the provision of an apparatus for evacuating a flexible container and for hermetically sealing such container after the vacuum has been applied in a much faster manner than has been possible heretofore.

Still another object of the invention is the provision of apparatus of the subject type incorporating programmed means for gathering the neck of the container, applying a clip thereto, cutting off the end of the container outwardly of the clip and for performing other functions without the intervention of the operator.

Yet another object of the invetnion is the provision of

2 means for effecting a more complete evacuation of the container by means of a retractable probe adapted to be projected into the container to insure that substantially all of the air is withdrawn therefrom.

Another object of the invention is the provision of a vacuum sealing apparatus which is adapted to be actuated at a higher rate of speed than prior art devices of like nature and which apparatus performs the various steps required with optimum efficiency regardless of the skill of the operator.

Other objects and advantages will be apparent from the following specification and from the drawings:

FIG. 1 is a side elevation of the apparatus of the present invention with a side of the cabinet broken away to show internal structure.

FIG. 2 is a greatly enlarged side elevation of the vacuum pipe assembly.

FIG. 3 is an enlarged cross section through the vacuum nozzle.

FIG. 4 is a semischematic front elevation of the upper end of the vacuum conduit and the nozzle assembly showing the retractable probe projected into a container.

FIG. 5 is a view looking upwardly toward the cabinet top showing the valves actuated by the actuator bar.

FIG. 6 is a cross section through the actuator bar showing the valves actuated thereby.

FIG. 7 is a view similar to FIG. 6 with some of the structure omitted to show the operation of the valves by the actuator bar.

FIG. 8 is a semischematic view showing the piping and valve arrangement.

In detail, and first with reference to FIG. 1, the invention includes a generally rectangular cabinet generally designated 10 and having a top 11 on which the clipping device generally designated 12 may be supported. The general arrangement of the cabinet and the clipping device is somewhat similar to that shown in Pat. No. 3,237,366 and reference may be made to said patent for details of certain devices and mechanism contained in the cabinet and not forming a part of the present invention.

As best seen in FIG. 2 a flexible vacuum hose 13 is connected at one end to a source of vacuum (not shown) and at its other end to a rigid horizontally extending pipe 14 which in turn is oscillatably supported on brackets 15, 16 extending upwardly from the bottom of the cabinet 10. Pipe 14 is divided into two parts 17, 18 connected by a pipe T 19 to a generally vertically extending vacuum pipe 20 which carries at its upper end a nozzle assembly generally designated 21.

The vertically extending vacuum pipe 20 is normally disconnected from the vacuum in part 18 of pipe 14 by means of a normally closed valve generally designated 23 that includes a valve element 24 mounted on one end of a valve stem 25 extending axially into part 17 of pipe 14 and which is slidably mounted within sleeve 26 fixedly secured to part 17. Part 17 thus constitutes the valve body of valve 23. The outer end of valve body 17 is provided with a pipe cap 28, and a compression spring 29 is interposed between cap 28 and the adjacent end of stem 25 so as to urge the valve element 24 to closed position at all times.

Cup seals 30, 31 are secured to sleeve 26 and the outer end of stem 25 respectively thus forming a cylinder therebetween. A conduit 32 for high pressure air is connected to valve body 17 intermediate said seals 30, 31 so that upon application of pressure through conduit 32 the valve is opened against the urgency of spring 29 causing the vacuum source to be directly connected with nozzle structure 21 through the generally vertically extending vacuum pipe 20. Upon release of the high pressure air the valve is of course automatically closed by spring 29; the space between seals 30, 31 being vented through a valve 69 to be described.

The upper end of vacuum pipe 20 is connected to one end of elongated cylinder 35 and communicates with a nozzle 36 which extends outwardly from said one end of the cylinder. Slidably disposed in cylinder 35 is a piston 38 to which is secured a shaft 39 which in turn is connected at its other end to the inner end of a probe 40. As best seen in FIG. 2 the probe 40 is adapted to be projected axially outwardly of the nozzle 36 to the position shown in FIGS. 2 and 4. As seen in FIG. 4 the probe 40 extends into the interior of the container 49 to be vacuum sealed so as to enhance the complete evacuation of the container and to prevent the mouth of the container being constricted so as to interfere with such complete evacuation.

Adjacent its inner end the probe 40 is provided with a plurality of holes 41 so that the outer end 42 of the probe communicates with the vacuum pipe 20 whether the probe is in its retracted or projected position. The probe 40 is normally urged to its projected position shown in FIGS. 2 and 4 by means of the application of a relatively light air pressure applied to cylinder 35 through a low pressure air conduit 44. Retraction of the probe 40 to its retracted position substantially entirely within the nozzle 36 is effected by the application of air pressure through high pressure conduit 45 to the opposite side of piston 38. At this point it may be noted that the use of a spring is obviated by this system and positive movement of the probe 40 is achieved whenever such movement is desired. It will be understood in this connection that it is necessary to retract the probe 40 to its retracted position before the sealing step of applying the clip to the mouth of the container is carried out. This will be described in greater detail later on.

As best seen in FIG. 1 the vertically extending vacuum pipe 20 passed through a slot 47 in the top 11 of cabinet 10 and said slot 47 is sufficiently long to permit the required swinging movement of the pipe 20.

The pipe 20 and its nozzle assembly 21 is shown in its inoperative position in FIG. 1 in full line and, as disclosed in Pat. No. 3,237,366, the evacuation and sealing steps are performed as the operator swings the pipe 20 to the left in FIG. 1 against the urgency of return spring 48 and toward the clipping mechanism 12. To this end the operator may grasp the nozzle 38 with his left hand while manipulating the package 49 and its contents 50 with his right hand.

Secured to the underside of cabinet top 11 is a base 52 which is formed to provide a downwardly projecting generally rectangular boss 53 provided with a rectangular slot 54 in which an actuating bar 55 is slidable. Fixed to the underside of boss 53 by screws 56 is a generally rectangular spool valve generally designated 59. The body of this valve 59 retains the actuating bar 55 within the slot 54. The spool of valve 59 is formed with an outwardly extending projection 60 which is adapted to be engaged by vacuum pipe 20 as the latter is moved from its inoperative position of FIG. 1 toward the clipper mechanism 12. The function of valve 59 will be described later on.

As best seen in FIG. 5, a yoke 63 is provided with its legs in straddling relation relative to vacuum pipe 20 and is connected by means of a pin 64 to the outer end of the actuating bar 55. Upon initial movement of the vacuum pipe 20 from its normal position of FIG. 1 toward the clipping mechanism 12 the end 66 of actuating bar 55 engages a roller 67 on the operating arm 68 of a valve 69 fixedly secured to base 52 (see FIG. 7). As seen in FIG. 8 valve 69 is connected to a high pressure air supply, preferably in the order of 100 lbs./sq. inch, and, upon the opening of said valve 69 by actuating bar 53, such high pressure air is conducted through conduit 32 to the vacuum valve 23 shown in FIG. 2 and previously described. The vacuum valve 23 is thus opened wide to permit the full vacuum to be applied through the probe 40 to the interior of the container 49.

The actuating bar 55 is provided with a groove 71 which is adapted to receive therein the actuating element 72 of another valve 73 which is also secured to the base 52. The length of groove 71 is predetermined so that upon further movement of the actuating bar past the point at which it actuates valve 69 the bar 55 depresses the actuating element 72 of valve 73 which, as seen in FIG. 8, connects the full line pressure with conduit 45 connected to cylinder 35 of the nozzle assembly 21. The probe 40 is thus immediately retracted before the clipping apparatus 12 is actuated to seal the mouth of the bag.

Upon further movement of the vacuum pipe 20 the same engages the projection 60 of spool valve 59 and the spool thereof is depressed thereby permitting the high pressure air to flow through valve 59 and into conduit 74 which connects said high pressure air with a gate actuating cylinder 75 thereby swinging to a closed position a gate 76 for gathering the mouth of the flexible container prior to the clipping step. This gate operation is similar to that disclosed in Pat. No. 3,237,366. However, by the present invention the gate 76 is not returned to its open position shown in FIG. 8 by means of a return spring but rather by means of low pressure air which is connected to cylinder 75 by a conduit 77 leading from a regulator 78 which is connected with the high pressure air supply and adjusted to provide an outlet pressure of say 10 lbs./sq. inch. By this structure quick actuation of gate 76 is insured both when closing and opening. It will also be noted that the low pressure line 44 which is connected to the cylinder assembly to urge the probe 40 to its projected position is also connected to low pressure line 77 and regulator 78. When gate 76 is opened the high pressure end of its air cylinder 75 is exhausted through valve 59.

Included in line 74 from valve 59 is a delay valve 80 which is preferably of the type shown in application Ser. No. 607,032 filed January 3, 1967. This valve 80 is not actuated until the pressure builds up sufficiently in line 74 after actuation of cylinder 75 to compress a compression spring 81 in valve 80 and thus permit the high pressure air to flow through conduit 82 to a poppet valve 83. Upon opening poppet valve 83 high pressure air is permitted to flow through conduit 84 into the upper end of clipper cylinder 85 which may be of the same general type shown in Pat. No. 3,237,366. Upon actuation of the clipper cylinder 85 a U-shaped clip is deformed around the neck of the flexible container which has been fed into the mouth of the clipper by the operator and which mouth has been gathered by the gate 76.

Communicating with cylinder 85 of the clipping apparatus 12 is a pressure control valve 87 which may be identical to valve 80 and which is set at a predetermined pressure so that it is not actuated until the desired amount of pressure has been applied to the piston of the clipper so as to achieve the desired degree of tightness of the clip. When such predetermined maximum pressure has been reached the pressure control valve 87 opens and permits the high pressure air to be conducted through conduit 88 to valve 59 (FIG. 5) for returning the spool therein to its normal position with the projection 60 projected. At this point the operator can feel a slight "kick" as the projection 60 is projected against the vacuum pipe 20 and this signals the completion of the cycle so that the operator may then manually return the vacuum pipe 20 to its original position of FIG. 1. The conduit 88 passes through the cylinder 89 of a cut off knife mechanism which serves to sever the excess material of the package outwardly of the clip which has been applied to the clipping apparatus.

At about the same time valve 59 is opened by engagement with the vacuum pipe 20, the roller 67 of valve 69 falls into a notch 90 (FIG. 7) on actuating bar 55 thus closing valve 59 which in turn immediately closes the vacuum valve 23. In other words, the closing of vacuum valve 23 is accomplished substantially simultaneously with the clipping operation thereby insuring that the vacuum is held on the package until clipping is carried out and further insuring that the vacuum is not wasted by its continued application after the clipping step. In order to prevent actuation of valve 69 as the actuating bar 55 is returned toward its inoperative position causing the roller 67 to move out of the notch 90, said roller is swingably mounted on operating arm 68 of the valve so that it simply swings away under the urgency of a light spring 92 without depressing the operating arm 68.

From the above description it will be seen that all of the steps required to be performed are carried out in a substantially automatic manner and the operator has no control over the timing of the steps or the amount of clipping force which is applied to the clip. This latter force may be predetermined by setting valve 87 by reference to a gage 91 thereon so that the clipping step cannot be interrupted by the operator until the predetermined clipping force has been achieved. It will also be noted that the steps of applying the vacuum, retracting the probe 40, actuating the gate 76, and applying the proper clipping pressure are all performed automatically and all the operator need do is to move the pipe 20 by means of the nozzle 36 in a smooth movement toward the clipping apparatus. It will also be seen that the various steps are accurately programmed so that they follow in their proper order thus permitting the entire operation to be speeded up since no discretion remains with the operator.

Although the cylindrical sidewalls of nozzle 36 may be imperforate, in some instances it has been found desirable to drill an annular row of holes 93 (FIG. 3) through the sidewalls at a point spaced slightly inwardly from the outer end of nozzle 36. Extending from said holes 93 to the outer end of nozzle 36 are relatively shallow grooves 94. The holes 93 are sufficiently close to the outer end of nozzle 36 so that the operator may readily grasp the mouth of the container at a point inwardly of said holes.

The provision of holes 93 prevents air from being trapped around the end of the nozzle if the material of the container collapses around the probe 40 or collapsed on itself after the probe has been retracted. The grooves 94 permit air from the container to be drawn therethrough even if the mouth of the container collapsed inwardly against the outer ends of holes 93.

The very specific description given above of the preferred form of the invention should not be taken as restrictive as it will be apparent that various modifications in design may be resorted to by those skilled in the art without departing from the scope of the following claims. For example the vacuum valve 23 which is urged to a closed position by compression spring 29 may be modified so as to employ the low pressure air for the closing function in the same manner as such low pressure air is used for opening gate 76 and projecting probe 40.

I claim:
1. In a clipping appartus of the type that includes a fluid actuated cylinder and a clip punch connected to the piston of said cylinder for driving a clip into sealing engagement around a flexible article,
   a fluid pressure circuit connected with said cylinder,
   normally closed first valve means adapted to be opened for connecting said circuit with said cylinder for actuating said punch,
   second valve means actuatable by a predetermined pressure in said cylinder for closing said first valve means after said punch has been driven into sealing engagement with said article.
2. Apparatus according to claim 1 wherein a fluid driven cut off knife is provided for severing said article outwardly of the sealing clip, said knife being actuated by said predetermined pressure at substantially the same time as said second valve means.
3. Apparatus according to claim 1 wherein a fluid driven gate mechanism is provided for constricting said article prior to sealing, said gate mechanism being within said fluid circuit, and third valve means for opening said first valve means when the pressure in said gate mechanism reaches a predetermined amount.

References Cited

UNITED STATES PATENTS

| | | | |
|---|---|---|---|
| 3,115,733 | 12/1963 | Tipper | 53—138X |
| 3,337,935 | 8/1967 | Vilotis | 29—33.5 |
| 3,401,499 | 7/1968 | Jahnke | 53—138 |

FRANCIS S. HUSAR, Primary Examiner

Z. R. BILINSKY, Assistant Examiner

U.S. Cl. X.R.

53—138